UNITED STATES PATENT OFFICE.

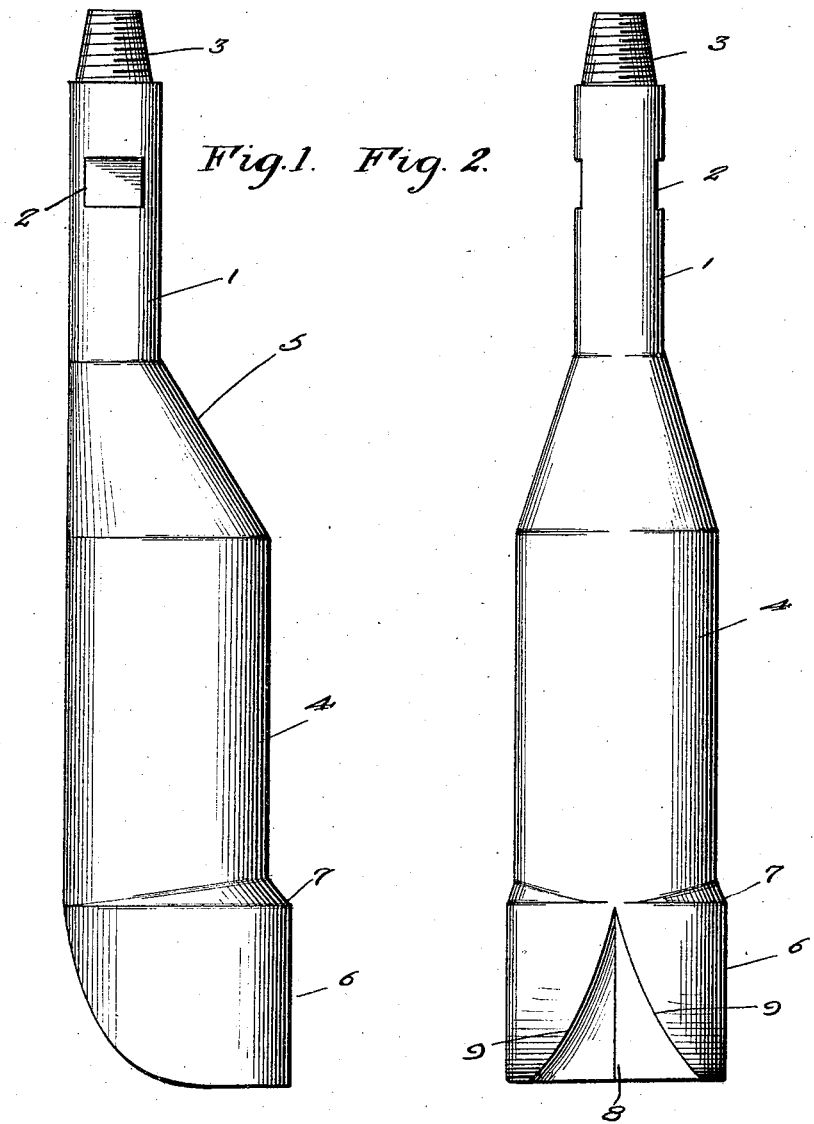

HARRY A. GREENLEE, OF PAWHUSKA, OKLAHOMA.

REAMER.

1,418,255. Specification of Letters Patent. Patented May 30, 1922.

Application filed December 13, 1920. Serial No. 430,277.

*To all whom it may concern:*

Be it known that I, HARRY A. GREENLEE, a citizen of the United States, residing at Pawhuska, in the county of Osage and State of Oklahoma, have invented new and useful Improvements in Reamers, of which the following is a specification.

My present invention has reference to a reamer designed for use in the drilling of oil, gas, artesian or other piped wells, and has for its object to produce a device of this character which may be readily inserted through the tubing or casing to enlarge an opening therebelow through which the casing may be readily lowered.

A further object is to produce a reamer for this purpose in which the body thereof is laterally offset from its shank, and the said body, at its lower end is provided with a head formed with jaws on the under face and at one side thereof, the construction being such as to permit of the same being readily passed through the well tubing, and after the latter has been elevated a desired distance, to have its shank centrally arranged in the tubing so that the body and the jaw carrying head thereof, when the shank is revolved will materially enlarge the opening for the reception of the casing.

It is a further object to produce a reamer for the purpose set forth in which the jaws carried by the head thereof are of a peculiar construction to receive therebetween the main pressure of the water in the hole being reamed so as to centralize the reamer in its work.

The foregoing, and other objects which will appear as the nature of the invention is better understood, may be accomplished by a simple construction, and arrangement of parts, such as is illustrated by the drawings.

In the drawings:—

Figure 1 is a side elevation of a reamer constructed in accordance with this invention.

Figure 2 is a front elevation thereof.

Figure 3 is an end view looking toward the jaws of the reamer.

As disclosed by the drawings the improved reamer includes a cross sectionally rounded shank 1 that has its sides cut to provide squared wrench holes 2 and that has its upper end provided with a threaded extension 3 whereby the reamer may be attached to the operating means therefor.

Integrally formed with the shank, but offset laterally from what I will term the front face of the shank is the body 4 of the improvement. The body is round in cross section, and is of a length preferably greater than that of the shank. The portion of the body connecting the same with the shank is flared toward the said shank, as indicated by the numeral 5, but the lower end of the body, from the outer face thereof, which, as stated, is in alignment with the outer face of the shank, is enlarged to provide an extending head 6 and a shoulder 7 between the head and body. The head 6 from its front face is cut inwardly at opposite angles, the said cut also entering the outer end of the head. The cut provides the head with a substantially V-shaped or flared pocket 8, and the walls of the pocket provide the head with jaws 9—9.

The shank of the improvement is attached to the ordinary means for operating such devices, and is passed through the well casing. The inner straight face of the body and head may be arranged in contacting engagement with one of the walls of the casing, but the opposite rear wall of the head may contact with the opposite wall of the casing. It will thus be noted that the shank is not arranged in the center of the casing when the reamer is lowered therethrough. The casing is elevated a suitable distance for the proper working of the reamer in the hole in which the casing is to be lowered. When the flared wall 5 contacts with the lower edge of the casing the body of the reamer will be directed outward of the casing. This is especially true when the reamer is turned. This will bring the shank in the center of the casing, so that the laterally extending portions of the body 4 and head 6 will be brought to one side of the casing. It will be apparent that by revolving the reamer a comparatively large hole will be made thereby. The flared pocket between the jaws 9—9 receives therein the water from the earth, and the pressure of such water materially assists in retaining the reamer in proper operative position.

The cutting edges of the jaws readily part the earth, and the space between the reamer and the casing permits of the proper pumping operation thereof.

Having thus described the invention, what I claim, is:—

1. A reamer for the purpose set forth, including a shank, a body coextensive therewith, but arranged laterally with respect to one face thereof, a flared wall connecting the body with the shank, a head on the outer end of the shank arranged laterally with respect to the face thereof that is flush with the face of the shank, said head having its face which aligns with the face of the head and shank provided with a V-shaped depression that enters the bottom thereof and that has its walls flared outwardly to provide a pocket, and cutting jaws to the opposite sides of the pocket.

2. A reamer including a body having a head at one end thereof, one side of the head being in a line with and rounded outwardly from one side of the body, the opposite side of the head extending laterally beyond the opposite side of the body, said head, from its rounded side having a V-shaped depression that enters the bottom thereof and that has its side walls flared outwardly to provide a pocket and cutting jaws to the opposite sides of the pocket, and a shank on the body at the end thereof opposite that provided with the head.

In testimony whereof I affix my signature.

HARRY A. GREENLEE.